United States Patent
Hess

[15] 3,673,483
[45] June 27, 1972

[54] TWO-WAY DRIVE FOR OPTICAL SYSTEMS AND THE LIKE

[72] Inventor: Karl Gunter Hess, Waldlaubersheim, Germany

[73] Assignee: Jos. Schneider & Co. Optische Werke, Bad Kreuznach/Rhineland, Germany

[22] Filed: Oct. 12, 1970

[21] Appl. No.: 80,018

[30]  Foreign Application Priority Data

Oct. 14, 1969  Germany......................P 19 51 672.4

[52] U.S. Cl................................................................318/618
[51] Int. Cl..........................................................G05b 5/01
[58] Field of Search......................................................318/618

[56]  References Cited

UNITED STATES PATENTS

| | | |
|---|---|---|
| 3,093,776 | 6/1963 | Bird et al. ...............................318/618 |
| 3,122,687 | 2/1964 | Romvari................................318/618 |
| 2,939,066 | 5/1960 | Crenshaw..........................318/618 X |
| 3,283,231 | 11/1966 | Askew....................................318/618 |

*Primary Examiner*—Benjamin Dobeck
*Attorney*—Karl F. Ross

[57]  ABSTRACT

A load, such as a servomotor for the positioning (e.g. tilting) of a television camera, is operable by a control circuit provided with an input ($E_1$) for a position signal and another input ($E_3$) for a speed signal. The positioning signal is applied, together with a feedback signal ($E_2$) from a position sensor, to a comparator whose positive or negative output generates an error signal of corresponding polarity and of a magnitude determined by the speed signal. A reversible load motor, coupled with the position sensor, also drives a generator to produce a reference signal of either polarity, the difference between the error signal and the reference signal producing a drive voltage of one or the other polarity for the load motor until the system is in balance.

4 Claims, 1 Drawing Figure

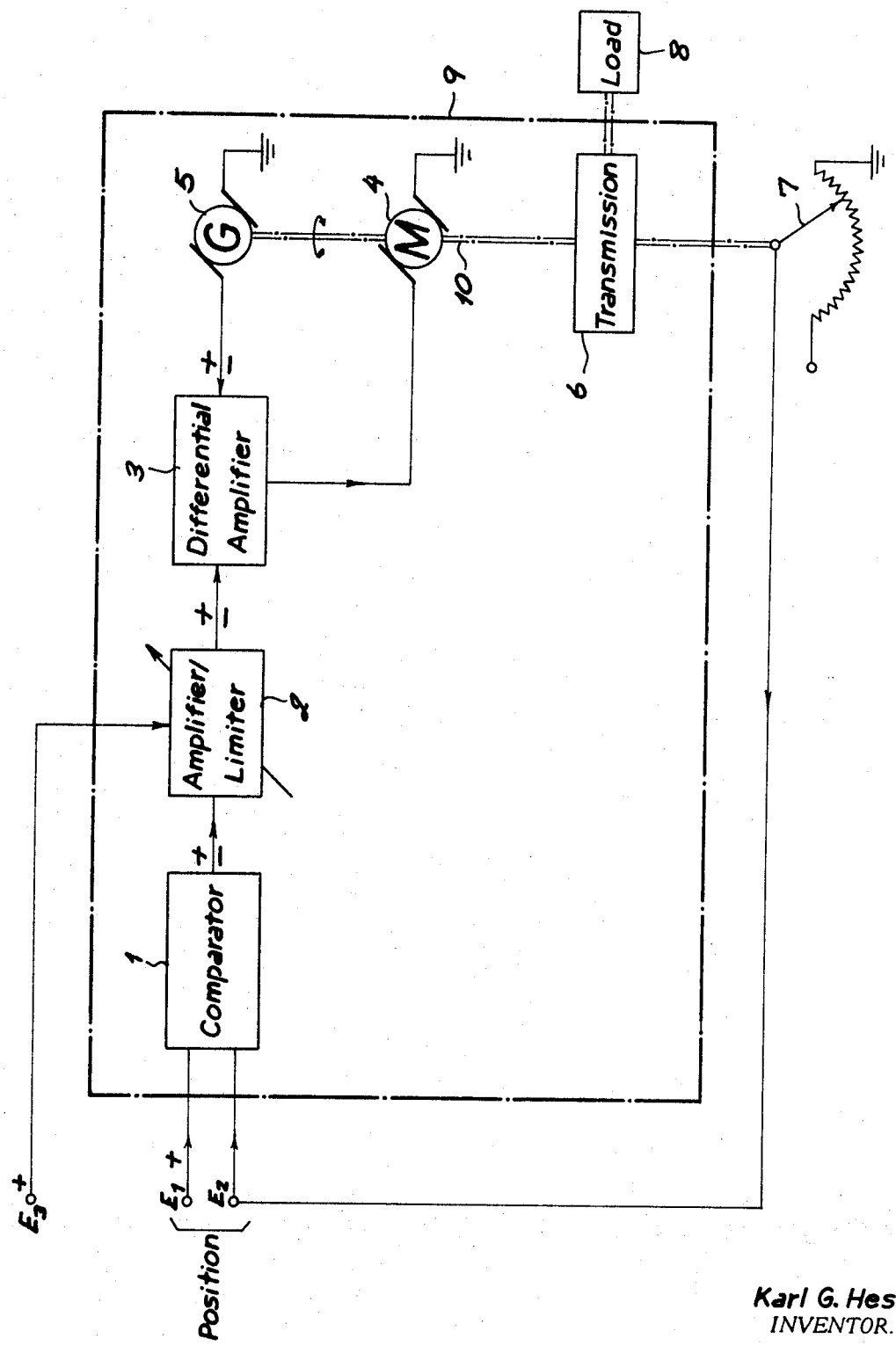

TWO-WAY DRIVE FOR OPTICAL SYSTEMS AND THE LIKE

My present invention relates to a control system for the positioning of a reversible load.

The general object of this invention is to provide means for reversibly displacing such a load at a constant but preferably adjustable rate, thus at a speed which is independent of the distance between the actual load position and the position sought to be obtained; this is particularly important in cases where the load is a mechanical component of an optical objective, a television camera or some other optical device requiring smooth transition from one position to another.

This object is realized, pursuant to my invention, by the provision of a reversible drive motor coupled not only with the load but also with a tachometer and with a position-sensing device, the latter generating a feedback signal indicative of load position whereas the former produces a reference signal of a polarity and magnitude determined by the direction and speed of motor rotation. A comparison circuit receives both the feedback signal and an externally (e.g. manually) applied positioning signal for deriving a bipolar error signal from the difference thereof; a limiter stage forming part of the comparison circuit clips the error signal to make its magnitude independent of the value of the difference between the two input signals. The clipped error signal, whose magnitude is preferably adjustable in accordance with a desired motor speed, is impressed upon one input of a differential circuit (e.g. amplifies) whose other input receives the reference signal from the tachometer; the output of this differential circuit constitutes a driving voltage of either polarity which actuates the load motor in a sense tending to reduce the error signal to zero.

By virtue of the clipping effect of the limiter stage, the motor speed in either direction is determined solely by the speed selector regardless of the relative magnitudes of the positioning signal and of the feedback signal derived from the position sensor. The positioning signal may be supplied by any conventional voltage source (e.g. a potentiometer) whose output varies in magnitude according to the spacing of a desired load position from a predetermined reference position. The load, therefore, will approach its new position at a selected speed independent of the distance it has to travel, this being true for either sense of displacement.

The invention will be described in greater detail hereinafter with reference to the accompanying drawing the sole FIGURE of which diagrammatically illustrates a representative embodiment.

In the drawing I have shown a conventional comparator 1 whose two inputs $E_1$, $E_2$ receive an externally applied positioning signal and an internally generated feedback signal, respectively. The positioning signal, here positive, may be larger or smaller than the feedback signal whenever the system is unbalanced by the operation of the voltage source connected to input $E_1$. There results, accordingly, a positive or negative error signal in the output of the comparator, this error signal being fed to an amplifier/limiter 2 having a control input $E_3$ which carries a speed signal (here also positive) of selected magnitude. Limiter stage 2 may comprise conventional circuitry for clipping both the positive and the negative output voltages of comparator 1 so that, in the presence of a significant error signal issuing from the comparator, a voltage of unit value ±1 is generated within that stage; this unit voltage is then selectively magnified, in steps or (preferably) continuously, by the applied speed signal $E_3$. The voltage of terminal $E_3$ may be used, for example, to set a potentiometer in the input of an operational amplifier receiving the output of the clipping circuit, yet in a simple case such a potentiometer could also be directly controlled by the operator with omission of terminal $E_3$.

The output of stage 2 is a modified error signal whose polarity is determined by the sign of the difference between the input voltages of comparator 1 and whose magnitude is manually or otherwise selected by the operator. This error signal is fed to one input of a differential amplifier 3 whose other input receives a reference voltage from a tachometer 5 shown as an electric voltage or current generator. Differential amplifier 3 lies in the input circuit of a reversible load motor 4 which is mechanically connected, via a linkage 10, with generator 5 and with a transmission 6 for driving a position sensor 7 and a load 8. Sensor 7, here shown as a potentiometer, generates the feedback signal applied to comparator input $E_2$; this sensor may also include an amplifier for the feedback signal. Load 8 may comprise, for example, a servomechanism for tilting or swinging a television camera within a predetermined angular range.

A common housing 9, indicated schematically, is shown to enclose the components 1–6 of my improved two-way drive for the load 8. Components 1–3 may be constituted by individually replaceable modules interconnected by plug-and-jack couplings. Limiter stage 2 may be combined with comparator 1 to a single module.

The constancy (for a given setting of control input $E_3$) of the displacement rate of the load 8 in response to any voltage difference in the input of comparator 1 limits the period of the instability, i.e. the time during which the system seeks its new equilibrium, to a predetermined maximum; such a system can therefore also be used as an analog/digital converter, e.g. for data transmission, with a fixed operating cycle in the course of which an analog voltage applied to input $E_1$ brings about a selected operating position for load 8 to generate (as by the selective closure of a set of contacts) the binary equivalent of the input signal. In such a case, the feedback voltage delivered by sensor 7 may vary in predetermined increments (rather than continuously) to establish the necessary number of discrete load positions.

I claim:

1. A control system for the positioning of a reversible load, comprising:
    a reversible drive motor for said load provided with an input circuit;
    a tachometer coupled with said motor for producing a reference signal of a polarity and magnitude determined by the direction and speed of motor rotation;
    position-sensing means coupled with said motor for generating a feedback signal indicative of load position;
    a source of adjustable control voltage;
    comparison means connected to receive said feedback signal together with a positioning signal and for deriving a bipolar error signal from the difference thereof;
    a limiter stage connected in the output of said comparison means for making the magnitude of said error signal independent of the value of said difference, said limiter stage having an input connected to said source for selectively varying the magnitude of said error signal;
    and differential circuitry in said input circuit connected to receive said reference signal from said tachometer and a modified error signal from said limiter stage for deriving therefrom a driving voltage of either polarity to actuate said motor in a sense tending to reduce said difference.

2. A system as defined in claim 1 wherein the coupling between said motor, said tachometer and said position-sensing means includes a mechanical transmission.

3. A system as defined in claim 2, further comprising a common housing for said comparison means, differential circuitry and transmission.

4. A system as defined in claim 1 wherein said limiter stage comprises an amplifier.

* * * * *